United States Patent
Sowizral et al.

(10) Patent No.: US 7,012,897 B1
(45) Date of Patent: Mar. 14, 2006

(54) LINK QUALITY AGENT

(75) Inventors: Henry Adam Sowizral, Bellevue, WA (US); Christopher Robin Payne, Redmond, WA (US); Ian Gareth Angus, Mercer Island, WA (US); Alan Shelton Wagner, Richmond (CA); Patrick Neal Harris, Redmond, WA (US); Kermit Andreas Hollinger, Renton, WA (US)

(73) Assignee: Terabeam Corporation, Falls Church, VA (US)

( * ) Notice: Subject to any disclaimer, the term of this patent is extended or adjusted under 35 U.S.C. 154(b) by 166 days.

(21) Appl. No.: 10/625,341

(22) Filed: Jul. 22, 2003

Related U.S. Application Data

(63) Continuation of application No. 09/782,956, filed on Feb. 13, 2001, now Pat. No. 6,678,251.

(51) Int. Cl.
*H04L 12/56* (2006.01)
(52) U.S. Cl. .............. 370/242; 370/228; 359/153
(58) Field of Classification Search ........ 370/216–228, 370/229–235, 241–249, 329–333; 359/142, 359/143, 152, 153
See application file for complete search history.

(56) References Cited

U.S. PATENT DOCUMENTS

| | | | |
|---|---|---|---|
| 5,309,503 A | 5/1994 | Bruckert et al. | |
| 5,815,298 A * | 9/1998 | Cern | 398/16 |
| 5,835,508 A | 11/1998 | Kushita | |
| 5,847,660 A | 12/1998 | Williams et al. | |
| 5,959,752 A | 9/1999 | Ota | |
| 6,018,663 A | 1/2000 | Karlsson et al. | |
| 6,038,219 A * | 3/2000 | Mawhinney et al. | 370/242 |
| 6,169,728 B1 | 1/2001 | Perreault et al. | |
| 6,201,795 B1 | 3/2001 | Baum et al. | |
| 6,262,973 B1 | 7/2001 | Shiraishi et al. | |
| 6,317,224 B1 * | 11/2001 | Lutgen et al. | 358/412 |
| 6,348,986 B1 * | 2/2002 | Doucet et al. | 398/128 |
| 6,400,477 B1 * | 6/2002 | Wellbrook | 398/45 |
| 6,490,067 B1 * | 12/2002 | Bloom et al. | 398/128 |

* cited by examiner

*Primary Examiner*—Dang Ton
*Assistant Examiner*—Phuc Tran
(74) *Attorney, Agent, or Firm*—Blakely Sokoloff Taylor & Zafman LLP

(57) ABSTRACT

A link quality agent running in a computer embedded in a device, such as an optical communication transceiver, to monitor an optical signal quality of the link. In one embodiment, avalanche photodiode (APD) and filter wheel values on each side of the free space link as well as packet errors from a distribution switch are monitored. When the link quality agent determines that the free space link is marginal (based on the monitored optical signal quality), the link quality agent configures down the port between the distribution switch and the router on the receive end of the free space link, and forces customer traffic over a backup link. When both ends of the free space link are again functional, the link quality agent configures the port up and routes customer traffic to the free space link.

20 Claims, 3 Drawing Sheets

LINK QUALITY AGENT

CROSS-REFERENCE TO RELATED APPLICATION

The present application is a continuation of application Ser. No. 09/782,956, filed Feb. 13, 2001 now U.S. Pat. No. 6,678,251 B2, the benefit of the priority date of which is claimed under 35 U.S.C. § 120.

BACKGROUND OF THE INVENTION

1. Field of the Invention

The present invention is related to free space optical communication systems and, in particular, to an intelligent agent in a free space optical communication system.

2. Background Information

Optical wireless transmission is way of providing multi-gigabit connectivity between two locations without the use of an optical fiber interconnection. At the transmitting end, an optical wireless system typically consists of an optical laser source, which is being modulated by a data source to produce and optically encoded data signal. The data source typically provides the intelligence or information to be transmitted, such as data, audio, video, messages, etc. An optical amplifier may amplify the optical signal, which is then transmitted into the atmosphere (or free-space) through a transmitting telescope as an optical transmission beam towards a receiving telescope. On the receiving end of an optical wireless system, a receiving telescope collects part of the optical beam and focuses it as a light spot into a receiving optical fiber. The receiving optical fiber is connected to a receiver/regenerator, which converts the optically encoded data signal back into an electrical data signal.

In an optical wireless system, the atmosphere is the propagation medium for the optical transmission beam (sometimes called a light beam). One drawback to using the atmosphere as the transmission medium is the effect that weather conditions have on the optically encoded data signal. For example, fog often causes the optical link to operate marginally, which means that the receiver may receive sufficient small packet handshaking signals, such as open shortest path first (OSPF) "hello" packets, but not enough of the transmitted data in large packets.

Normally, when data is not being received, the system would shift to a backup means to deliver data. In the situation in which the system is marginal, however, the system may not shift to a backup means to deliver the data and much of the data is lost. Alternatively, the system may shift to a backup means when the receiver does not receives sufficient "hello" packets and return to the primary means to deliver data when the receiver does receive sufficient "hello" packets. The term "flapping" describes the condition in which the optical link goes in and out of tolerance numerous times such that the router has to excessively reconfigure the means to deliver data. Flapping consumes a large percentage of bandwidth and therefore must be controlled. Moreover, in this situation, the system experiences high link error rates, which results in the system having to retransmit packets. Retransmission of packets seriously degrades link bandwidth for data.

BRIEF DESCRIPTION OF THE DRAWINGS

The invention is best understood by reference to the figures wherein references with like reference numbers generally indicate identical, functionally similar, and/or structurally similar elements. The drawing in which an element first appears is indicated by the leftmost digit(s) in the reference number in which.

DETAILED DESCRIPTION

Figure 1:
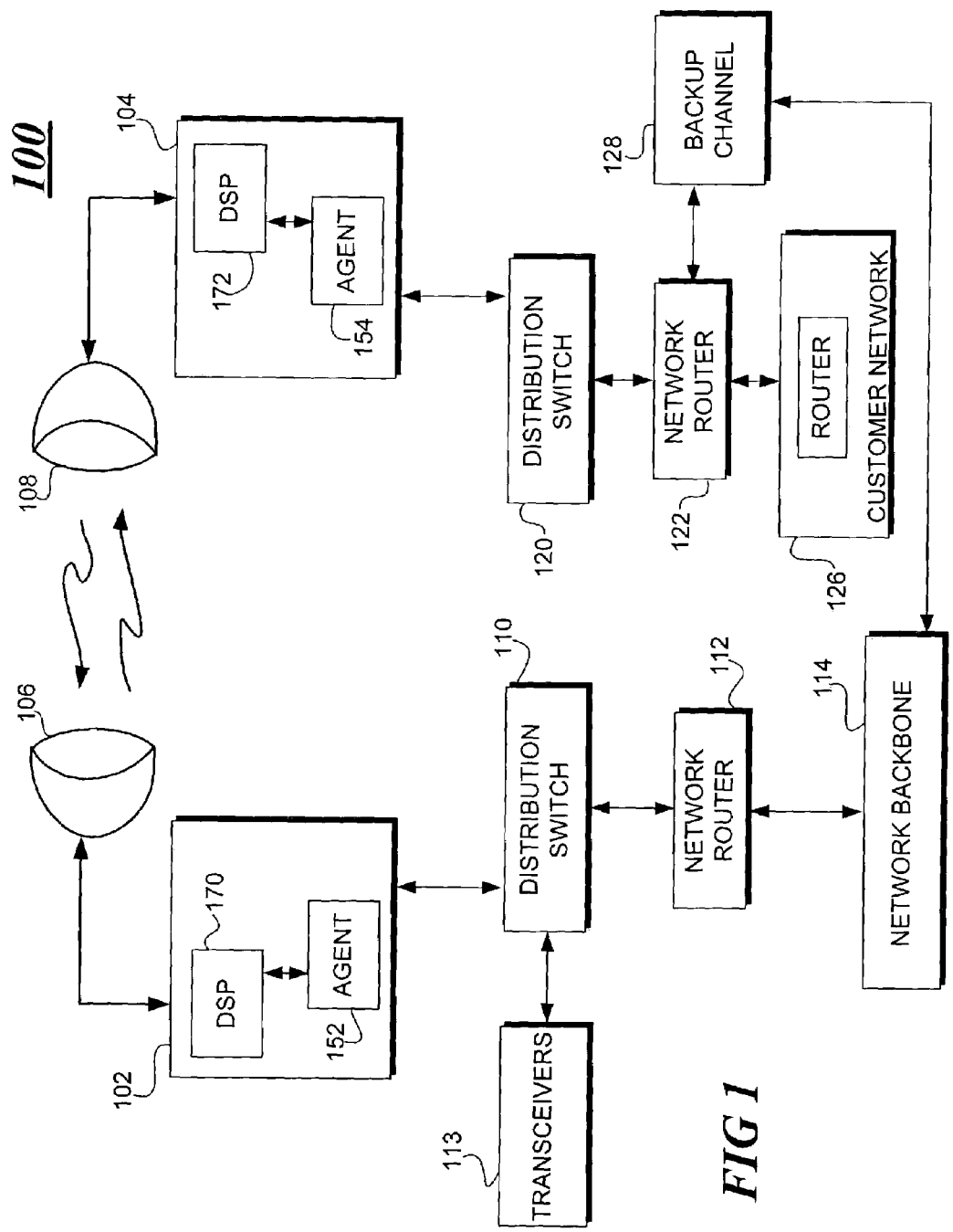
FIG. 1 is a high-level block diagram of a communication system according to an embodiment of the present invention.

FIG. 1 is a high-level block diagram of a communication system 100. In the following description, numerous specific details, such as particular processes, materials, devices, and so forth, are presented to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Some parts of the description will be presented using terms such as agent, link, light beam, transceiver, photon, remote monitors, and so forth. These terms are commonly employed by those skilled in the art to convey the substance of their work to others skilled in the art.

Other parts of the description will be presented in terms of operations performed by a computer system, using terms such as receiving, detecting, collecting, transmitting, and so forth. As is well understood by those skilled in the art, these quantities and operations take the form of electrical, magnetic, or optical signals capable of being stored, transferred, combined, and otherwise manipulated through mechanical and electrical components of a computer system; and the term "computer system" includes general purpose as well as special purpose data processing machines, systems, and the like, that are standalone, adjunct or embedded.

Various operations will be described as multiple discrete steps performed in turn in a manner that is most helpful in understanding the invention. However, the order in which they are described should not be construed to imply that these operations are necessarily order dependent or that the operations be performed in the order in which the steps are presented.

Reference throughout this specification to "one embodiment" or "an embodiment" means that a particular feature, structure, process, step, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The communication system 100 can be any communication system that employs an analog transmission medium or that operates in an analog encoding environment. The communication system 100 may be an optical system that uses the atmosphere as the transmission medium and in which data is transmitted and received via an optical carrier. In other embodiments, the communication system 100 is an any wireless communication system where the atmosphere is the transmission medium and data is transmitted and received across an analog link via a radio frequency (RF) carrier, a microwave carrier, and the like.

The system 100 as illustrated in FIG. 1 includes a transceiver 102 and a transceiver 104, which to transmit and receive traffic in free space via an antenna 106 and an antenna 108, respectively. Traffic can be customer traffic or test traffic, which are small bursts of data.

In one embodiment, the transceiver 102 may be a single access transceiver (SAT) and the transceiver 104 may be a holographic photon collector (HPC). Either the transceiver 102 or 104 may be a reflective photon collector (RPC), a multiple access transceiver (MAT), an SAT, an HPC, or any other device to transmit and receive a light beam from free space.

Transceivers typically have analog signal strength detectors. One such analog signal strength detector is an avalanche photodiode (APD), which is a photon detector. Transceivers also may employ techniques to attenuate the light beam, such as filter wheels. In operation, if the photon count for the light beam at the detector is low, the light beam attenuator can be adjusted to allow more photons to be received.

The antennas 106 and 108 can be telescopes. Transceivers and antennas suitable for implementing the transceiver 102 ad 104 and the antennas 106 and 108 are well known.

The transceiver 102 is coupled to a network device, such as a distribution switch 110, which filters and forwards packets. In one embodiment, the distribution switch 110 allows multiple Ethernet connections. Network devices are well known and distribution switches suitable for implementing the distribution switch 110 are well known. The distribution switch 110 is coupled to a network router 112 and to one or more transceivers 113.

The transceivers 113 are typically similar to the transceiver 102 and the transceiver 104, which are well known.

The network router 112 moves packets of data from source to destination, typically by passing messages and analyzing a routing table to determine the best path for packets to take. The network router 112 also configures the best route for the packets to reach their ultimate destination. Network routers suitable for implementing the network router 112 are well known. The network router 112 is coupled to a network backbone 114.

The network backbone 114 generally is a connection of multipoint hubs (MPH), customer premised equipment (CPE), and/or points of presence (POP). The multipoint hubs may be connected to each other via reflective photon collectors (RPC). In an embodiment, the network of multipoint hubs and reflective photon collectors is the network backbone 114. Backbones suitable for implementing the network backbone 114 are well known.

The transceiver 104 is coupled to a network device, such as a distribution switch 120, which may be similar or identical to the distribution switch 110. The distribution switch 120 is coupled to a network router 122.

The network router 122 in an embodiment is similar to or identical to the network router 112. The network router 122 is coupled to a router 124 in a customer network 126. The router 124 also is similar to or identical to the network router 112. The customer network 126 in an embodiment is typically any well-known local area network (LAN) or wide area network (WAN), including topology, protocol, and architecture, which is well known.

The network router 122 also is coupled to an alternate channel, such as a backup channel 128. In one embodiment, the backup channel 128 is a T-1 line, which is a well-known dedicated phone connection supporting data rates of 1.544 Megabits per second (Mbps).

An agent 152 and an agent 154 monitor the performance of the optical link through the atmosphere, and may access equipment's state variables (e.g., antenna, transceiver, router, computer, or remote device). To determine whether to route traffic through the backup channel 128, the agents 152 and 154 may employ a computational module, a neural network, or any suitable decision-making technique.

According to an embodiment of the present invention, the agents 152 and 154 are a collection of software modules associated with the transceivers. In one embodiment, the agents 152 and 154 are running on a device embedded in the transceivers. The agents 152 and 154 monitor optical information, such as optical detector values and light beam attenuator values for each transceiver. In one embodiment, the agents 152 and 154 determine the quality of the analog signal by monitoring the photon count using an APD and the light beam attenuation using a filter wheel, for example. There may be other ways to determine the quality of the analog signal besides monitoring the photon count using an APD and the light beam attenuation using a filter wheel. For example, when the data is transmitted and received via a radio frequency (RF) carrier a squelch reading on a radio may be used.

The agents 152 and 154 also monitor router information, such as number of packets, number of packet errors, and so forth, accessed from the distribution switches 110 and 120, respectively. The agents 152 and 154 may access optical and router information using a variety of techniques. For example, the agents 152 and 154 may access the distribution switches using a well-known Simple Network Management Protocol (SNMP) interface. The agents 152 and 154 may access routers using a well-known command line interface (CLI) or well-known remote monitoring (RMON) network management protocol.

The agents 152 and 154 are invoked when the quality of the optical signal or the router information is marginal. In the embodiment shown in FIG. 1, when the agents 152 and 154 are invoked data, such as customer traffic, is rerouted from the free space transmission medium to the backup channel 128. When the quality of the optical signal or the router information returns to normal, data, such as customer traffic, is routed back to the free space transmission medium from the backup channel 128.

A digital signal processor (DSP) 170 and a DSP 172 each control tracking of the light beam for the transceivers 102 and 104, respectively. In one embodiment, the DSP 170 and a DSP 172 positions the transceivers 102 and 104 to ensure the light beam is properly focused.

Figure 2:
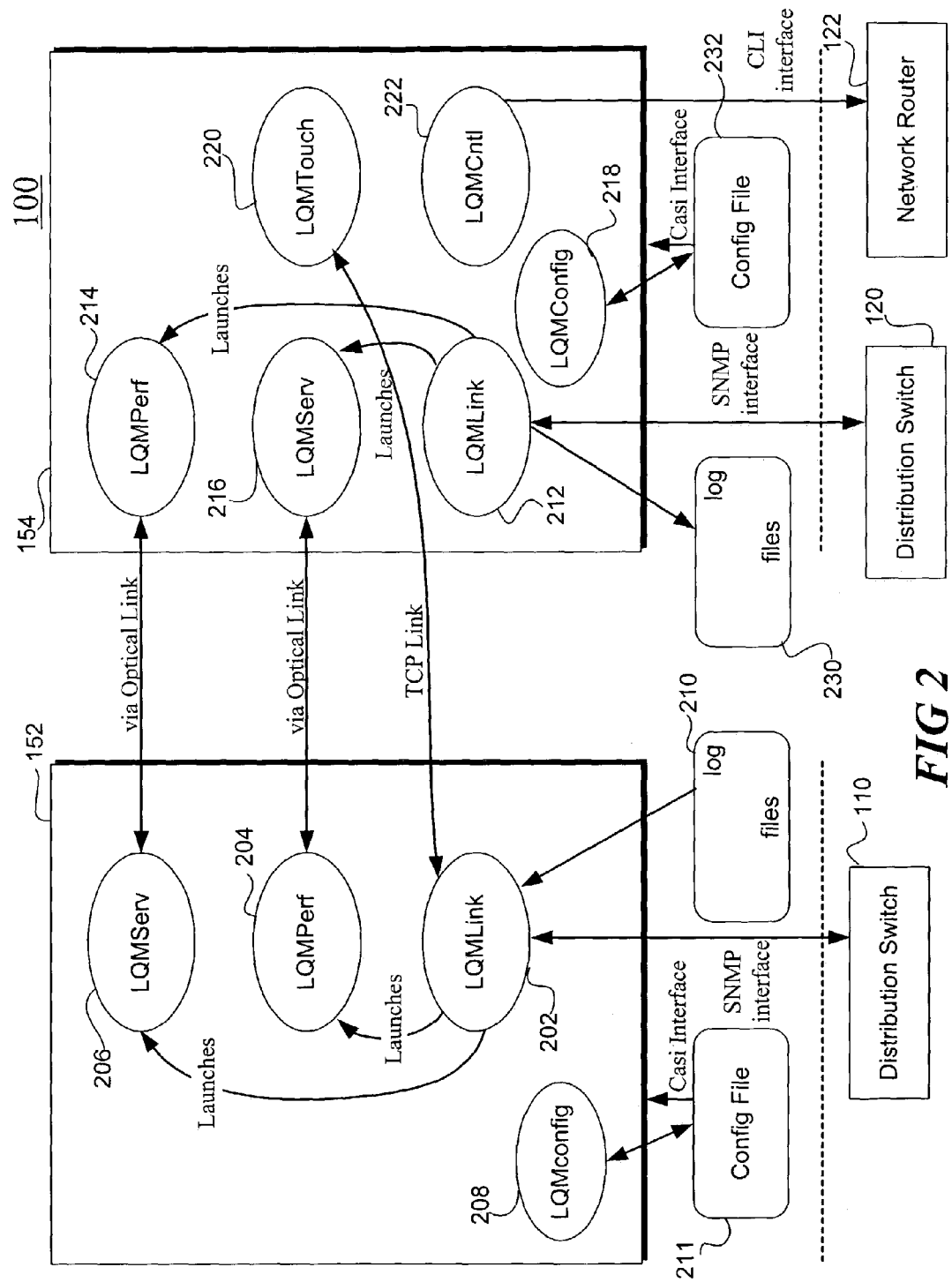
FIG. 2 is a more detailed block diagram of the communication system in FIG. 1.

FIG. 2 shows the system 100 in more detail, showing state diagrams of the agents 152 and 154. The agent 152 includes a link quality link module LQMLink 202, a link quality performance module LQMPerf 204, a link quality server module LQMServ 206, and a link quality configuration module LQMConfig 208. For every link quality server module there is a link quality performance module.

The LQMLink 202 accesses the distribution switch 110 to monitor router information (e.g., number of packets, number of packet errors, and so forth). The LQMLink 202 also accesses log files, such as log files 210, which store optical information, to keep track of photon counts and filter wheel settings, for example.

The LQMLink 202 launches LQMPerf 204 and LQMServ 206. The link quality performance module LQMPerf 204 and the link quality server module LQMServ 206 are generated by "Netperf", which is a well-known network performance tester. Other network performance testers may be used to generate the link quality performance module LQMPerf 204 and the link quality server module LQMServ 206.

The LQMConfig 208 accesses a configuration file Config File 211. The Config File 211 configures a link to run an agent in the future. As depicted in FIG. 2, there may be a software application interface between the agent 152 and the Config File 211.

The agent 154 includes a link quality link module LQMLink 212, a link quality performance module LQMPerf 214, a link quality server module LQMServ 216, a link quality configuration module LQMConfig 218, a link quality proxy module LQMTouch 220, and a link quality control module LQMCntrl 222.

The LQMLink 212 performs substantially the same or identical function in the transceiver 104 as the LQMLink 202 does in the transceiver 102. In one embodiment, the LQMLink 212 accesses the distribution switch 120 and log files 230. The log files 230 performs substantially the same as or identical function in the log files 210. As depicted in FIG. 2, there may be a software interface, such as a Common Application Software Interface, between the agent 154 and the Config File 232.

The LQMPerf 214 performs substantially the same as or identical function in the transceiver 104 as the LQMPerf 204 does in the transceiver 102 and the LQMServ 216 performs substantially the same as or identical function in the transceiver 104 as the LQMServ 206 does in the transceiver 102. The LQMPerf 204 communicates with the LQMPerf 214 to exchange test traffic. The LQMServ 206 communicates with the LQMServ 216 to exchange test traffic. The link quality performance module LQMPerf 214 and the link quality server module LQMServ 216 are generated by "Netperf", which is a well-known network performance tester. Other network performance testers may be used to generate the link quality performance module LQMPerf 214 and the link quality server module LQMServ 216.

The LQMConfig 218 performs substantially the same as or identical function in the transceiver 104 as the LQMConfig 208 does in the transceiver 102. In one embodiment, the LQMConfig 218 accesses a configuration file Config File 232, to test the configuration of the analog (e.g., radio wave, microwave, laser, light, or the like within the electromagnetic spectrum) link and to configure one or more links to run an agent in the future.

The LQMTouch 220 is a proxy for the LQMLink 202 in the transceiver 104. In one embodiment, the LQMTouch 220 opens a socket in the transceiver 104 and listens to the optical and router information on behalf of the LQMLink 202. The LQMLink 202 connects to the LQMTouch 220.

The LQMLink 202 or the LQMTouch 220 writes a file(s) to indicate the preferred status of the transceiver. For example, the LQMLink 202 may write an "up local" file to indicate that the transceiver 102 should be up and operating, a "down local" file to indicate that the transceiver 102 should be down for customer traffic and operating only for test traffic, an "up remote" file to indicate that the transceiver 104 should be up and operating, or a "down remote" file to indicate that the transceiver 104 should be down for customer traffic and operating only for test traffic. Likewise, the LQMTouch 222 may write an "up local" file to indicate that the transceiver 104 should be up and operating, a "down local" file to indicate that the transceiver 104 should be down for customer traffic and operating only for test traffic, an "up remote" file to indicate that the transceiver 102 should be up and operating, or a "down remote" file to indicate that the transceiver 102 should be down for customer traffic and operating only for test traffic.

The LQMCntrl 222 monitors and acts on the existence of the files.

Figure 3:
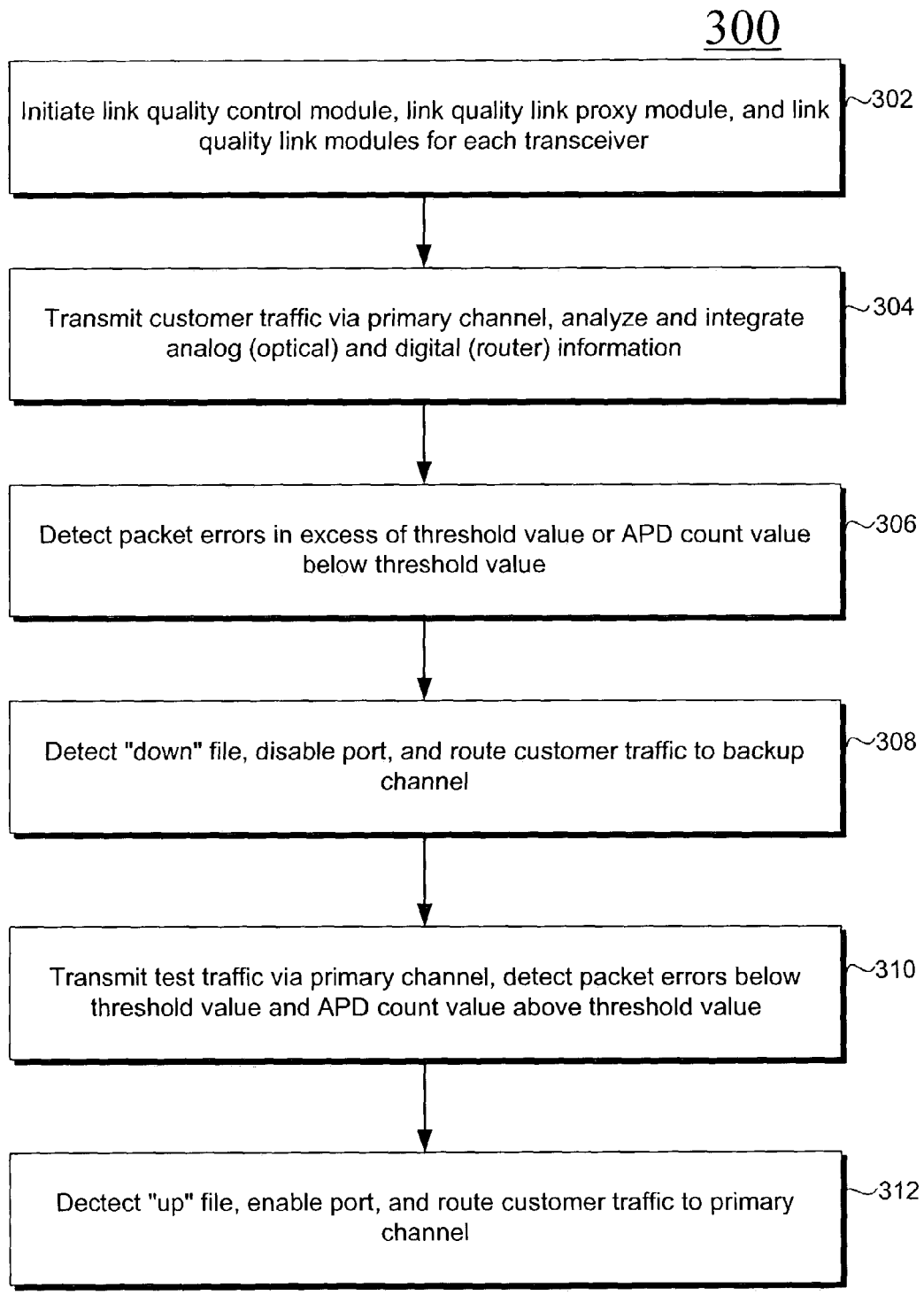
FIG. 3 is a flowchart illustrating an approach to link quality monitoring.

FIG. 3 is a flowchart 300 depicting an approach to link quality monitoring. In step 302, the LQMLink 202, the LQMLink 212, the LQMCntrl 222, and the LQMTouch 220 are initiated. In one embodiment, Sysmon, which is a well-known network monitoring tool designed to provide high performance and accurate network monitoring, initiates the LQMLink 202, the LQMLink 212, the LQMCntrl 222, and the LQMTouch 220.

In step 304, customer traffic is transmitted from transceiver to transceiver via the primary channel (free space). The LQMLink 202 and the LQMLink 212, analyze and integrate the (digital) router information with the (analog) optical information to decide whether to route customer traffic through the backup channel 128. If the photon count falls below a threshold value, the LQMLink 202 and the LQMLink 212 interpret this as marginal optical link performance. If the photon count is above a threshold value, the LQMLink 202 and the LQMLink 212 allows the customer traffic to flow through the primary channel (via the optical link).

In step 306, the LQMLink 202 or the LQMLink 212 detect that the photon count is below a threshold value. The LQMLink 202 or the LQMLink 212 also may detect that the number of packet errors exceeds a threshold value. The LQMLink 202 or the LQMLink 212 also may detect a sudden spike in the number of packet errors or a sustained increase in the ratio of packet errors to the number of packets transmitted when computed over a parameterized number of samples. The LQMLink 202 or the LQMLink 212 write a "down local" file or a "down remote" file for either transceiver 102 or 104, respectively. Of course, the link agents 152 and 154 may use other techniques other than packet error values and the ratio of packet errors to the number of packets transmitted to monitor the performance of the optical link through the atmosphere to determine whether to route customer traffic through the backup channel 128.

In step 308, the LQMCntrl 222 detects a "down local" file or a "down remote" file for either transceiver 102 or 104, the LQMCntrl 222 telnets to the network router 122 via the CLI interface to disable the port between the network router 122 and the distribution switch 120. The network router 122 detects that the port between the network router 122 and the distribution switch 120 is disabled and performs a well-known routing technique, such as OSPF, and finds another route for customer traffic, such as through the backup channel 128 to the network backbone 114.

When the port between the network router 122 and the distribution switch 120 has been disabled and customer traffic has been rerouted, in step 310, the LQMLink 202 and/or the LQMLink 212 launch the LQMServ 206 or the LQMServ 216, respectively, and begin sending test traffic via the LQMPerf 204 and the LQMPerf 214, respectively, to test the optical link. The LQMPerf 204 communicates with the LQMServ 206 and the LQMPerf 214 communicates with the LQMServ 216 to send and receive the test traffic across the optical link. The LQMLink 202 or the LQMLink 212 continue to monitor the distribution switches 110 and 120, which will provide the number of packets and the number of packet errors for the test traffic.

This process is iterative and continues until the photon count is above a threshold value and the ratio of packet errors to the number of packets transmitted is below a threshold value. In one embodiment, when the photon count is above a threshold value and the ratio of packet errors to the number of packets transmitted is below a threshold value the agents 152 and 154 continue to hold the port between the network router 122 and the distribution switch 120 disabled for a configurable period of time, to prevent flapping, for example. If the photon count falls below the threshold value or the ratio of packet errors to the number of packets transmitted is above the threshold value, the count down of the configurable period of time is reset.

In step 312, when the photon count returns to being above a threshold value and the ratio of packet errors to the number of packets transmitted returns to being below a threshold value for the configurable period of time, this is detected, the LQMLink 202 writes an "up local" file to indicate that the transceiver 102 can come up and receive customer traffic and an "up remote" file to indicate that the transceiver 104 can come up and receive customer traffic. The LQMTouch 222 writes an "up local" file to indicate that the transceiver 104 can come up and receive customer traffic and an "up remote" file to indicate that the transceiver 102 can come up and receive customer traffic. The LQMCntrl 222 detects the "up local" file and the "up remote" file for both transceivers 102 or 104 and telnets to the network router 122 via the CLI interface to enable the port between the network router 122 and the distribution switch 120. When the port between the network router 122 and the distribution switch 120 is enabled, customer traffic flows through the port between the network router 122 and the distribution switch 120 and out to free space, which is the primary channel.

If the LQMCntrl 222 detects a "down local" file or a "down remote" file for either transceiver 102 or 104 after the port between the network router 122 and the distribution switch 120 has been recently disabled, the LQMCntrl 222 telnets the network router 122 via the CLI interface to disable the port between the network router 122 and the distribution switch 120 and the configurable period of time may be reconfigured to a longer period of time. This can be used to prevent flapping as well.

Although embodiments of the present invention are described with respect to an optical free-space communication system, the present invention is not so limited. For example, the present invention may be implemented in any system that transmits and receives using an analog transmission medium or that operates in an analog encoding environment.

The invention claimed is:

1. A system comprising
first and second wireless optical system transceivers to exchange customer traffic via a primary channel comprising a wireless optical system link;
first and second network devices coupled to the first and second wireless optical system transceivers, respectively, to selectively route the customer traffic via the primary channel or via an alternate channel; and
first and second link quality agents, coupled to the first and second wireless optical system transceivers, respectively, and coupled to the first and second network devices, respectively, to monitor an optical signal quality of the wireless optical system link and to control the first and second network devices to route the customer traffic to the alternate channel and to route test traffic to the wireless optical system link when the optical signal quality of the wireless optical system link is determined by at least one of the first and second link quality agents to have entered a marginal state, wherein the first and second link quality agents monitor one of an analog or a digital quality of the wireless optical system link.

2. The system of claim 1, the first and second link quality agents further to reroute the customer traffic back to the wireless optical system link via control of the first and second network devices when it is determined by at least one of the first and second agents that the optical signal quality of the wireless optical system link has returned to a non-marginal state.

3. The system of claim 1, wherein the alternate channel routes traffic via a computer network coupled between the first and second network devices.

4. The system of claim 1, wherein the alternate channel employs a different transport medium than the wireless optical system link.

5. A method, comprising:
initiating a link quality agent;
transmitting customer data between first and second wireless optical system transceivers over a primary channel comprising a wireless optical system link;
monitoring an optical signal quality of the wireless optical system link via the link quality agent; and
rerouting the customer data to an alternate channel and transmitting test data over the wireless optical system link if the link quality agent determines the quality of the wireless optical system link is marginal,
wherein said wireless optical system link and the alternate channel route the customer data along different transport mediums.

6. The method of claim 5, wherein the optical signal quality of the wireless optical system link is determined to have entered a marginal state by determining a received analog signal strength is below a threshold value.

7. The method of claim 5, wherein the optical signal quality of the wireless optical system link is determined to have entered a marginal state by determining that a received packet error count is above a threshold value.

8. The method of claim 5, wherein the optical signal quality of the wireless optical system link to have entered a marginal state by determining that a ratio of packet errors to a number of packets received is above a threshold value when computed over a parameterized number of samples.

9. The method of claim 5, wherein the optical signal quality of the wireless optical system link is determined to have entered a marginal state by determining that a ratio of packet errors to a number of packets received is above a threshold value and that a received analog signal strength is below a threshold value when computed over a parameterized number of samples.

10. The method of claim 5, further comprising rerouting the customer data to be transmitted over the wireless optical system link and discontinuing transmission of the test data over the wireless optical system link when it is determined by the link quality agent that the optical signal quality of the wireless optical system link has returned to a non-marginal state.

11. The method of claim 10, wherein rerouting the customer data from the wireless optical system link to the alternate channel and rerouting the customer data back to the wireless optical system link comprise respective switchover conditions, further comprising implementing a configurable delay between when the quality of the link is determined to have changed between marginal and non-marginal states and when an associated changeover condition occurs to prevent network flapping.

12. The method of claim 5, wherein the quality of the wireless optical system link is determined to have entered a marginal state by determining that both an analog quality of the link and a digital quality of the link have fallen below a threshold level of performance.

13. The method of claim 5, wherein the wireless optical system link employs a first transport medium and the alternate channel employs a second transport medium different from the first transport medium.

14. A machine-readable medium having machine-readable instructions stored thereon, which when executed cause a machine to perform the operations of:
    initiating a link quality agent;
    transmitting customer data between first and second wireless optical system transceivers over a primary channel comprising a wireless optical system link;
    monitoring an optical signal quality of the wireless optical system link via the link quality agent; and
    rerouting the customer data to an alternate channel and transmitting test data over the wireless optical system link if the link quality agent determines the optical signal quality of the link is marginal, wherein said wireless optical system link and the alternate channel route the customer data along different transport mediums.

15. The machine-readable medium of claim 14, wherein execution of the machine instructions further performs the operation of monitoring a detector output to determine if a received analog signal strength is below a threshold value, whereby the optical signal quality of the link is determined to have entered a marginal state.

16. The machine-readable medium of claim 14, wherein execution of the machine instructions determines that the optical signal quality of the link has entered a marginal state by performing the operation of determining that a received packet error count is above a threshold value.

17. The machine-readable medium of claim 14, wherein execution of the machine instructions further performs the operations of determining if the optical signal quality of the wireless optical system link has returned to a non-marginal state, and in response thereto rerouting the customer data to be transmitted over the wireless optical system link and discontinuing transmission of the test data over the wireless optical system link.

18. The machine-readable medium of claim 14, wherein rerouting the customer data from the wireless optical system link to the alternate channel and rerouting the customer data back to the wireless optical system link comprise respective switchover conditions, and wherein execution of the machine instructions further performs the operation of implementing a configurable delay between when the quality of the link is determined to have changed between marginal and non-marginal states and when an associated changeover condition occurs to prevent network flapping.

19. The machine-readable medium of claim 14, wherein the wireless optical system link employs a first transport medium and the alternate channel employs a second transport medium different from the first transport medium.

20. A method for sending customer data from a first location to a second location, comprising:
  (a) providing a primary channel comprising a wireless optical system link enabled by respective wireless optical system transceivers disposed at the first and second locations;
  (b) providing access to a backup channel comprising a network connection between the first and second locations;
  (c) routing customer data over the primary channel while monitoring an optical signal quality of the wireless optical system link to determine if the link enters a marginal operating state, and in response thereto,
  (d) rerouting the customer data over the backup channel; and
  (e) sending test data over the wireless optical system link while monitoring the optical signal quality to determine if the link returns to a non-marginal operating state, and in response thereto,
  (f) rerouting the customer data back to the primary channel, wherein rerouting the customer data from the primary channel to the backup channel and rerouting the customer data back to the primary channel comprise respective switchover conditions, the method further comprising implementing a configurable delay between when the link quality is determined to have changed between marginal and non-marginal states and when an associated changeover condition occurs to prevent network flapping; and
  (g) repeating operations (c)–(f) on a continuous basis.

* * * * *